(12) United States Patent
Park et al.

(10) Patent No.: US 8,908,490 B2
(45) Date of Patent: Dec. 9, 2014

(54) CHANNEL STATE INFORMATION FEEDBACK DEVICE, METHOD THEREOF, AND BASE STATION

(75) Inventors: Kyoungmin Park, Seoul (KR); Jianjun Li, Seoul (KR); Sungjin Suh, Seoul (KR); Sungkwon Hong, Seoul (KR)

(73) Assignee: Pantech Co., Ltd., Seoul (KR)

( * ) Notice: Subject to any disclaimer, the term of this patent is extended or adjusted under 35 U.S.C. 154(b) by 140 days.

(21) Appl. No.: 13/639,451

(22) PCT Filed: Apr. 4, 2011

(86) PCT No.: PCT/KR2011/002310
§ 371 (c)(1),
(2), (4) Date: Oct. 4, 2012

(87) PCT Pub. No.: WO2011/126243
PCT Pub. Date: Oct. 13, 2011

(65) Prior Publication Data
US 2013/0028068 A1    Jan. 31, 2013

(30) Foreign Application Priority Data
Apr. 5, 2010  (KR) .................. 10-2010-0031146

(51) Int. Cl.
*H04J 11/00* (2006.01)
*H04B 7/04* (2006.01)
*H04B 7/06* (2006.01)

(52) U.S. Cl.
CPC .............. *H04B 7/065* (2013.01); *H04B 7/0478* (2013.01); *H04B 7/0639* (2013.01)
USPC .......................................... 370/203; 370/310

(58) Field of Classification Search
None
See application file for complete search history.

(56) References Cited

U.S. PATENT DOCUMENTS

| 2010/0103877 | A1* | 4/2010 | Wang et al. | 370/328 |
| 2010/0208578 | A1* | 8/2010 | Lee et al. | 370/210 |
| 2011/0222464 | A1* | 9/2011 | Haustein et al. | 370/315 |
| 2011/0235567 | A1* | 9/2011 | Seo et al. | 370/312 |
| 2012/0170675 | A1* | 7/2012 | Li et al. | 375/267 |
| 2012/0201282 | A1* | 8/2012 | Li et al. | 375/219 |

OTHER PUBLICATIONS

R1-100190, 3GPP TSG-RAN WG1 #59, Valencia, Spain, Jan. 18-22, 2010.
R1-101128, 3GPP TSG-RAN WG1 #60, San Francisco, USA, Feb. 22-26, 2010.
R1-101290, 3GPP TSG-RAN WG1 #60, San Francisco, USA, Feb. 22-26, 2010.
R1-101009, 3GPP TSG-RAN WG1 #60, San Francisco, USA Feb. 22-26, 2010.
International Search Report for corresponding PCT Application No. PCT/KR2011/002310 dated Dec. 28, 2011.

* cited by examiner

*Primary Examiner* — Kevin C Harper
(74) *Attorney, Agent, or Firm* — H.C. Park & Associates, PLC

(57) ABSTRACT

An embodiment of the present invention relates to a wireless communication system, wherein said wireless communication system uses multiple input and multiple output antenna (MIMO) on both transmission and receiving ends.

11 Claims, 7 Drawing Sheets

CHANNEL STATE INFORMATION FEEDBACK DEVICE, METHOD THEREOF, AND BASE STATION

CROSS-REFERENCE TO RELATED APPLICATION

This application is the National Stage Entry of International Application PCT/KR2011/002310, filed on Apr. 4, 2011, and claims priority from and the benefit of Korean Patent Application No. 10-2010-0031146, filed on Apr. 5, 2010, both of which are incorporated herein by reference for all purposes as if fully set forth herein.

BACKGROUND

1. Field

The present invention relates to a wireless communication system, and more particularly, to a method and device for channel state information feedback that uses a multiple input and multiple output (MIMO) antenna in both a transmitting end and a receiving end, and a base station.

2. Discussion of the Background

As communication systems have developed, various wireless terminals have been utilized by consumers, such as companies and individuals.

Therefore, communication service providers have created a new communication service market for wireless terminals, and have continuously attempted to expand an existing communication service market by providing reliable and inexpensive services.

A MIMO system is a scheme that increases a wireless communication capacity, and a maximum communication capacity supported by the MIMO system may increase in proportion to the number of antennas. However, an information transmission capacity supported by the MIMO system is actually decreased as the number of antennas increases, which is a phenomenon caused by various constraint conditions of the communication system. To increase the communication capacity of the MIMO system in proportion to the number of antennas, an interference free or orthogonal precoding that prevents inter-layer interference may need to be used. However, it has been difficult to be embodied in the communication system.

SUMMARY

Therefore, the present invention has been made in view of the above-mentioned problems, and an aspect of the present invention is to perform precoding without an inter-layer interference. A common method for precoding without the inter-layer interference may be a method of performing precoding using unique vectors obtained through singular value decomposition (SVD). A common communication system may perform codebook-based precoding and thus, the SVD-based precoding may be performed in the common system as follows. In the common system, a codebook may be formed of N codewords or a precoding matrix, and precoding may be performed using $C_n$ having a minimum difference from the unique vectors from among the codewords of the codebook.

$$\min_{n}|V - c_n|$$

In the equation, V may be written as $$V=[\bar{v}_0 \bar{v}_1 \ldots \bar{v}_{n-1}],$$

which is a combination of the unique vectors.

To control transmission power for each antenna, generally each element of $C_n$ is designed to have the same size. When each element of $C_n$ is designed in this manner, a large difference between $C_n$ and V may exist, and this may preclude the SVD-based precoding.

Another aspect of the present invention is to perform multi-phase precoding in which precoding of each phase is expressed as a product of matrices. For example, when two-phases precoding is performed, precoding may be performed using a plurality of codewords having a minimum difference from a unique vector as illustrated in the following equation.

$$\min_{n,m}|V - c_{in}^n \times c_{out}^m|$$

Another aspect of the present invention is to provide a method of designing a precoder so that a minimum value of a difference between the unique vector of the equation and the precoder is less than a predetermined threshold value in a common communication system that requires the identical transmission power for each antenna.

In accordance with an aspect of the present invention, there is provided a base station in a wireless communication system, the base station including: a layer mapper to perform mapping of a codeword to a layer; at least two precoders to perform precoding of mapped symbols sequentially, using a precoding matrix; and two or more antennas to propagate a precoded symbol into the air, wherein the most internal precoder from among the precoders performs precoding using a precoding matrix satisfying $P_{in}P_{in}^H=I$ ($P_{in}$ denotes the most internal precoding matrix, H denotes an operator of the Hermitian matrix, and I denotes a unit matrix).

In accordance with another aspect of the present invention, there is provided a channel state information feedback device in a wireless communication system, the device including: a reference signal receiving unit to receive a reference signal from a base station; a channel estimation unit to estimate a channel using the received reference signal; a channel state information generating unit to generate, based on a channel estimation result of the channel estimation unit, channel state information including internal channel feedback information designating an internal codeword that is selected from an internal codeword codebook including codewords satisfying $c_{in}^n(c_{in}^n)^H=I$ ($c_{in}^n$ denotes a codeword written by an index n) and external channel feedback information designating an external codeword that is selected from an external codeword codebook including codewords satisfying $$\min_{n,m}|V_t - c_{in}^n \times c_{out}^m|$$

($V_t$ denotes an eigen vector of a channel or a channel covariance matrix at t and $c_{out}^m$ denotes a codeword written by an index m); and a feedback unit to feed back the generated channel state information.

In accordance with another aspect of the present invention, there is provided a channel state information feedback method, the method including: a reference signal receiving step that receives a reference signal from a base station; a channel estimation step that estimates a channel using the received reference signal; a channel state information generating step that generates, based on a channel estimation result of the channel estimation step, channel state information including internal channel feedback information designating an internal codeword that is selected from an internal codeword codebook including codewords satisfying $c_{in}^n(c_{in}^n)^H=I$ ($c_{in}^n$ denotes a codeword written by an index n) and external channel feedback information designating an external codeword that is selected from an external codeword codebook including codewords satisfying $$\min_{n,m}|V_t - c_{in}^n \times c_{out}^m|$$

($V_t$ denotes an eigen vector of a channel or a channel covariance matrix at t and $c_{out}^m$ denotes a codeword written by an index m); and a feedback step that feeds back the generated channel state information.

DETAILED DESCRIPTION OF THE ILLUSTRATED EMBODIMENTS

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
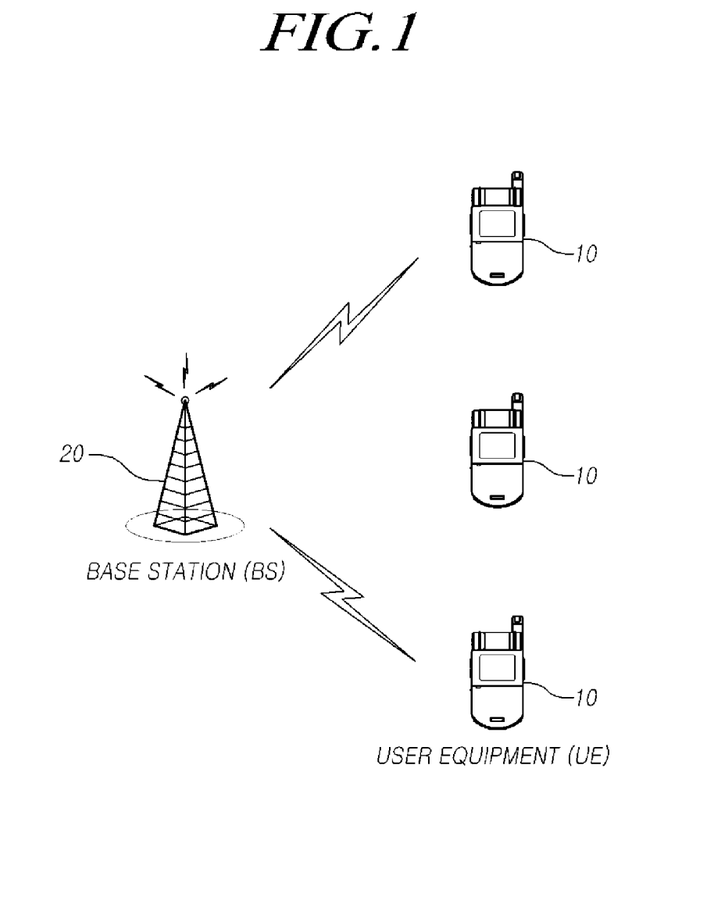
FIG. 1 is a diagram illustrating a wireless communication system according to an embodiment of the present invention.

FIG. 1 is a block diagram illustrating a wireless communication system according to an embodiment of the present invention.

The wireless communication system may be widely installed so as to provide various communication services such as voice data, packet data, and the like.

Referring to FIG. 1, the wireless communication system may include a User Equipment (UE) 10 and a Base Station (BS) 20. The user equipment 10 and the base station 20 is may use various power allocation methods to be described in the following descriptions.

The UE 10 may be an inclusive concept indicating a user terminal utilized in wireless communication, including a User Equipment (UE) in WCDMA, LTE, HSPA, and the like, and a Mobile Station (MS), a User Terminal (UT), a Subscriber Station (SS), a wireless device and the like in GSM.

The base station 20 or a cell may refer to a fixed station where communication with the user equipment 10 is performed, and may also be referred to as a Node-B, an evolved Node-B (eNB), a Base Transceiver System (BTS), an Access Point, and the like.

That is, the base station 20 or the cell may be construed as an inclusive concept indicating a portion of an area covered by a Base Station Controller (BSC) in CDMA, a NodeB in WCDMA, and the like, and the concept may include various coverage areas, such as a megacell, a macrocell, a microcell, a picocell, a femtocell, and the like.

In the specifications, the user equipment 10 and the base station 20 are used as two inclusive transceiving subjects to embody the technology and technical concepts described in the specifications, and may not be limited to a predetermined term or word.

The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like.

Uplink transmission and downlink transmission may be performed based on a Time Division Duplex (TDD) scheme that performs transmission based on different times, or based on a Frequency Division Duplex (FDD) scheme that performs transmission based on different frequencies.

An embodiment of the present invention may be applicable to resource allocation in an asynchronous wireless communication scheme that is advanced through GSM, WCDMA, and HSPA, to be Long Term Evolution (LTE) and LTE-advanced, and may be applicable to resource allocation in a synchronous wireless communication scheme that is advanced through CDMA and CDMA-2000, to be UMB. Embodiments of the present invention may not be limited to a specific wireless communication scheme, and may be applicable to all technical fields to which a technical idea of the present invention is applicable.

A representative orthogonal precoding scheme to prevent inter-layer interference in a MIMO system may include a singular value decomposition (SVD) scheme that performs precoding using an eigen vector of a channel or a channel covariance matrix. The orthogonal precoding scheme may generate mutually orthogonal layers and may perform simultaneous transmission through the orthogonal layers and thus, may support a maximum spatial multiplexing gain that may be theoretically supported by the MIMO system. Also, the orthogonal precoding scheme increases a communication capacity of the MIMO system in proportion to a number of antennas and thus, an MIMO system having a larger number of antennas may have a higher efficiency.

In a wireless communication system using the SVD scheme, (1) information associated with an eigen vector used in the SVD is obtained through an operation in a receiving end such as a user equipment and may require a large amount of feedback overhead when the information is transferred to a transmitting end, and (2) the eigen vector is a vector of which elements have different amplitudes and phases and thus, it may be inappropriate in the commonly used wireless communication system that needs to maintain transmission power to be identical for each antenna.

To overcome both problems and to use the SVD scheme in an MIMO system, the present invention provides a precoder structure that performs two or more precodings, that is, multi-phase precoding, and provides a codebook generating and using method that performs, based on a codebook, each precoding of the multi-phase precoding with a small amount of feedback overhead.

Hereinafter, a process in which a transmitting device performs two-phase precoding using the SVD scheme in the MIMO system and a codebook generating method thereof will be described. Although two-phase precoding is described as an example, a process of performing three or more phase precoding and a codebook thereof are substantially the same as the two-phase precoding.

Figure 2:
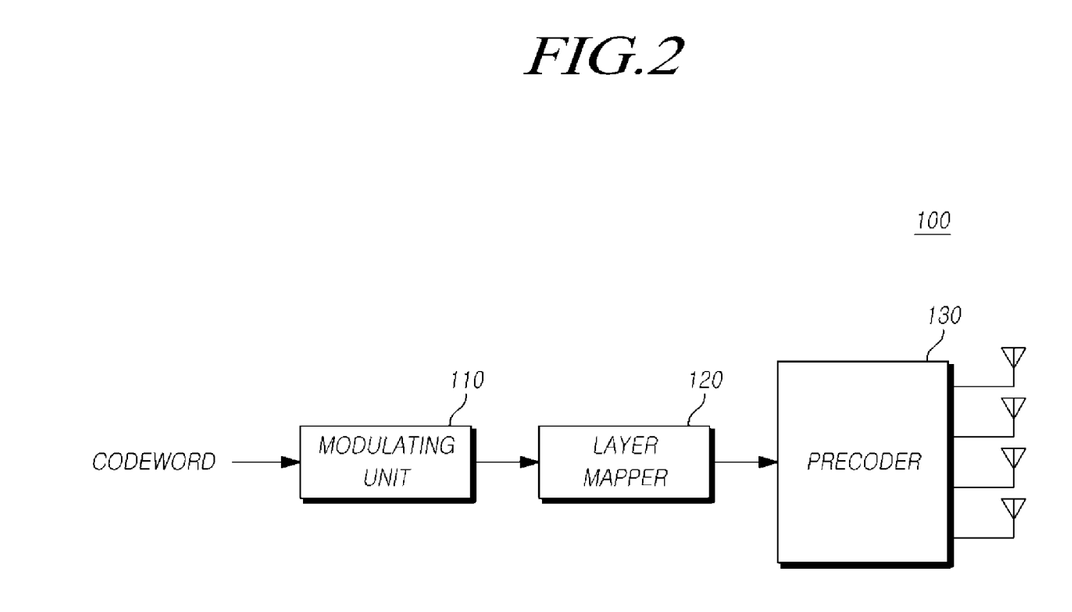
FIG. 2 is a block diagram illustrating a transmitting device according to an embodiment of the present invention.

FIG. 2 is a block diagram illustrating a transmitting device according to an embodiment of the present invention.

Referring to FIG. 2, a wireless communication system 100 may include a modulating unit 110, a layer mapper 120, and a precoder 130. The wireless communication system may be a communication system or a transmitting device of the base station 10 of FIG. 1.

Bits that are input in a form of codewords after channel coding in a downlink may be scrambled by a scrambler, and may be input into the encoding and modulating unit 110. The encoding and modulating unit 110 may modulate the scrambled bits into a complex modulation symbol, and the layer mapper 120 may map the complex modulation symbol to a single layer or a plurality of transmission layers. Subsequently, the precoder 130 may perform precoding of the complex modulation symbol in each transmission channel of an antenna port. After that, a resource element mapper may map a complex modulation symbol associated with each antenna port to a corresponding resource element.

Subsequently, an OFDM signal generator may generate a complex time domain OFDM signal for each antenna. The complex time domain OFDM signal may be transmitted through an antenna port.

Although a signal generating structure of a downlink physical channel of the wireless communication system according to embodiments of the present invention has been described with reference to FIG. 2, embodiments of the present invention may not be limited thereto. That is, the signal generating structure of the downlink physical channel of the wireless communication system according to embodiments of the present invention may omit other component elements, may substitute other component elements, or may add other component elements.

When packet unit information to be transmitted by a codeword is transferred, a packet may be generated through a subsequent operation and the packet may be transferred to a receiving end through one or more transmissions. Here, the codeword may refer to a block of channel-coded symbols. The transmission may be performed using two codewords or one or more codewords, or may be performed based on another unit different from the codeword.

The entire transmitting device has been described in the foregoing, and hereinafter, a precoder included in the transmitting device will be described.

Figure 3:
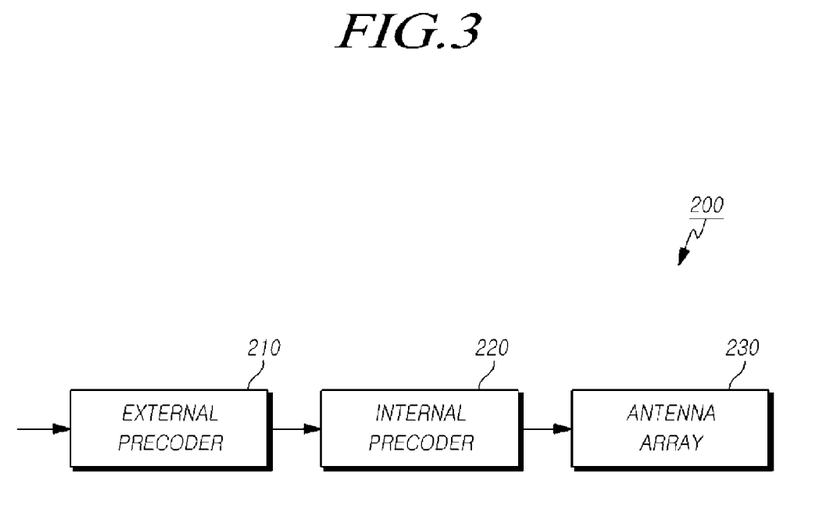
FIG. 3 is a block diagram illustrating a precoder according to another embodiment of the present invention.

FIG. 3 is a block diagram illustrating a precoder according to another embodiment of the present invention.

Referring to FIG. 3, a precoder 200 according to another embodiment may include two or more precoders, for example, an external precoder 210 and an internal precoder 220, and an antenna array 230 including two or more antennas that propagate a precoded symbol into air. The external precoder 210 and the internal precoder 220 may perform precoding with respect to information $\bar{x}$ to be transmitted to a channel H in a form of an entire precoding matrix $P_{in} \times P_{out}$, sequentially using each of two precoding matrices ($P_{out}$ and $P_{in}$).

The two precoding matrices ($P_{out}$ and $P_{in}$) may be selected from a codebook based on each channel feedback information from a user equipment, for example, precoding matrix indicators ($PMI_{out}$ or $PMI_{in}$). In this example, the two precoding matrix indicators may be fed back based on the same codebook or different codebooks. The codebook may be a unitary codebook or not. In other words, the external precoder 210 and the internal precoder 220 may perform precoding using the same codebook or different codebooks.

Also, codewords included in the codebook may be in an identical form or in different forms. Also, all elements of the codewords included in the codebook may have the same amplitude or may have different amplitudes.

The two precoding matrices ($P_{out}$ and $P_{in}$) used when the external precoder 210 and the internal precoder 220 perform precoding may correspond to an eigen vector of a channel H or a channel covariance matrix, a combination of eigen vectors, or a vector or matrix having a similar form and size, with respect to the channel H.

Hereinafter, conditions that enable the two precoding matrices to correspond to an eigen vector of a channel H or a channel covariance matrix, a combination of eigen vectors, or a vector or a matrix having a similar form and size, with respect to the channel H will be described and a codebook including matrices satisfying the condition will be described.

A transmission signal $\bar{y}$ obtained by multiplying information $\bar{x}$ to be transmitted to a channel H and an eigen vector V of a channel covariance matrix may be recovered at a receiving end such as a user equipment without inter-layer interference. This is may be expressed by Equation 1.

$$\bar{y} = V\bar{x} \quad \text{[Equation 1]}$$

$$\bar{z} = \hat{y} = H^H(H\bar{y} + \bar{\eta}) \quad \text{[Equation 2]}$$

Here, Z denotes information recovered from a receiving end such as a user equipment, $H^H$ denotes the Hermitian matrix of a channel H, and $\bar{\eta}$ denotes noise.

The Equation may be modified as follows and shows that the transmission signal $\bar{y}$ may be recovered from a receiving end such as a user equipment without inter-layer interference.

$$\hat{y} = H^H(H\bar{y} + \bar{\eta}) = H^H H V\bar{x} + H^H\bar{\eta} = \lambda V\bar{x} + H^H\bar{\eta} = \bar{y} + H^H\bar{\eta} \quad \text{[Equation 3]}$$

Here, $\lambda$ denotes an eigen value of a channel covariance matrix.

As described in the foregoing, the external precoder 210 and the internal precoder 220 may perform precoding with respect to the information $\bar{x}$ to be transmitted to a channel H in a form of an entire precoding matrix $P_{in} \times P_{out}$, sequentially using each of two precoding matrices ($P_{out}$ and $P_{in}$). Therefore, the transmission signal $\bar{y}$ at a transmitting end may be as follows.

$$\bar{y} = P_{in} P_{out} \bar{x} \quad \text{[Equation 4]}$$

Therefore, when the two precoding matrices ($P_{out}$ and $P_{in}$) correspond to an eigen vector of a channel H or a channel covariance matrix, a combination of eigen vectors, or a vector or matrix having a similar form and size with respect to the channel H, the transmission signal $\bar{y}$ may be recovered from a receiving end such as a user equipment without inter-layer interference.

When two precoding matrices ($P_{out}$ and $P_{in}$) are vectors that are similar to the eigen vector of the channel H with respect to the channel H, this may be expressed as follows. When the two precoding matrices ($P_{out}$ and $P_{in}$) that are vectors similar to the eigen vector of the channel H with respect to the channel H are used, the transmission signal may be recovered from a receiving end such as a user equipment, without inter-layer interference or with a minimum interference.

$$V_t \approx c_{in}^n \times c_{out}^m \qquad \text{[Equation 5]}$$

Here, $V_t$ denotes an eigen vector of a channel or a channel covariance matrix at t, and $c_{in}^n$ and $c_{out}^m$ denote codewords written by an index n and an index m, respectively, from among codewords included in an internal codeword codebook and an external is codeword codebook.

When the internal precoder 220 shown from the external precoder 210 defines a virtual channel including a channel to be $H_{out}$, the virtual channel may be expressed as follows.

$$H_{out} = H \times P_{in} \qquad \text{[Equation 6]}$$

Also, an eigen vector of the virtual channel is defined to be $V_{out}$, a relationship between the eigen vector $V_{out}$ of the virtual channel and a channel H may be as follows.

$$V = P_{in} V_{out} \qquad \text{[Equation 7]}$$

A covariance matrix of the virtual channel $H_{out}$ may be expressed as follows.

$$Cov_{out} = H_{out}^H H_{out} \qquad \text{[Equation 8]}$$

When the virtual channel $H_{out}$ is applied to the equation of the covariance matrix, it may be expressed as follows.

$$Cov_{out} = (HP_{in})^H HP_{in} \qquad \text{[Equation 9]}$$

Based on a definition of an eigen vector of a covariance matrix, it may be expressed as follows.

$$Cov_{out} \times V_{out} = \lambda_{out} V_{out} \qquad \text{[Equation 10]}$$

An expression based on the definition of the eigen vector of the covariance matrix may be modified as follows.

$$Cov_{out} \times V_{out} = (HP_{in})^H HP_{in} V_{out} = P_{in}^H H^H HP_{in} V_{out} = P_{in}^H H^H HV = P_{in}^H \lambda V \qquad \text{[Equation 11]}$$

Equation 10 and Equation 11 may be modified as follows.

$$\lambda P_{in}^H V = \lambda_{out} V_{out} \qquad \text{[Equation 12]}$$

A conditional expression of a precoding matrix $P_{in}$ of the internal precoder 220 may be obtained by substituting Equation 7 to Equation 12.

$$P_{in} P_{in}^H V_{out} = \frac{\lambda_{out}}{\lambda} V_{out} \qquad \text{[Equation 13]}$$

Therefore, the codebook for the precoding matrix $P_{in}$ of the internal precoder 220 may satisfy the above equation with respect to the channel H. In particular, the codebook for the precoding matrix $P_{in}$ of the internal precoder 220 may satisfy the following equation with respect to the channel H.

$$P_{in} P_{in}^H = I \qquad \text{[Equation 14]}$$

Accordingly, in the case where the external precoder 210 and the internal precoder 220 perform precoding with respect to the information $\bar{x}$ to be transmitted to the channel H in a form of an entire precoding matrix $P_{in} \times P_{out}$, sequentially using each of two precoding matrices ($P_{out}$ and $P_{in}$), when a product of the two precoding matrices ($P_{out}$ and $P_{in}$) is an eigen vector of the channel H with respect to the channel H, a transmission signal may be recovered from a receiving end without inter-layer interference.

In this example, the codebook for the precoding matrix $P_{in}$ of the internal precoder 220 may satisfy Equation 14 with respect to the channel H so that the relationship between the eigen vector $V_{out}$ of the virtual channel and the channel H corresponding to Equation 7 may be valid.

When a product of at least two precoding matrices ($P_{out}$ and $P_{in}$) is a vector similar to an eigen vector of a channel H, with respect to at least the channel H, a transmission signal may be recovered from a receiving end such as a user equipment without inter-layer interference or with minimum interference.

The entire transmitting device and the precoder included in the transmitting is device have been described, and hereinafter, a channel state information feedback device that feeds back channel state information to the transmitting device will be described.

Figure 4:
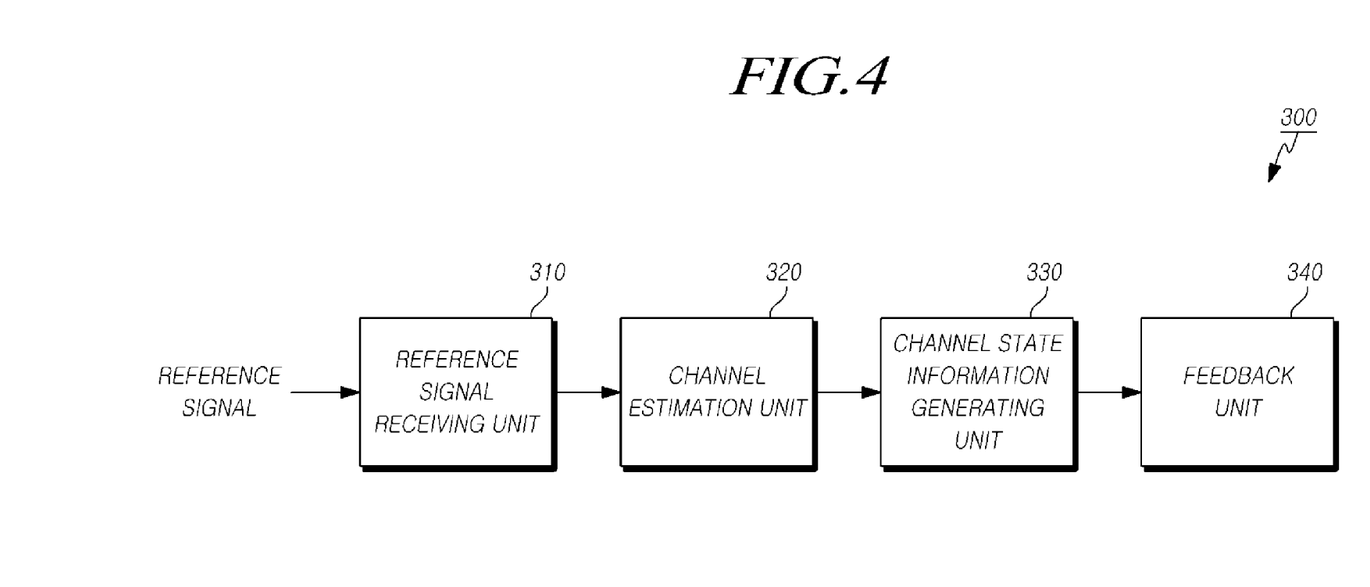
FIG. 4 is a function block diagram illustrating a channel state information feedback device according to an embodiment of the present invention.

FIG. 4 is a function block diagram illustrating a channel state information feedback device according to an embodiment of the present invention.

A MIMO channel state information feedback device 300 may be embodied as hardware or software in an existing UE that is currently connected or an additional UE that attempts connection, but this may not be limited thereto and may be embodied in a base station and the like.

The MIMO channel state information feedback device 300 may include a reference signal receiving unit 310 to receive, from the base station, a reference signal, for example, a channel state index-reference signal (CSI-RS), a channel estimation unit 320 to estimate a channel based on the received CSI-RS, a channel state information generating unit 330 to generate corresponding channel state information based on a channel estimation result of the channel estimation unit, and a feedback unit 340 to feed back the generated channel state information.

The reference signal receiving unit 310 and the channel estimation unit 320 may be embodied separately or integrally, and may be embodied integrally as occasion demands.

The reference signal receiving unit 310 may receive a CSI-RS unique to a cell, and may have information associated with at which band (subcarrier) of a reception signal and at which symbol the CSI-RS is received and thus, may measure a CSI-RS reception value by determining a signal of a corresponding time-frequency domain.

The CSI-RS may be a reference signal that is transmitted by the base station so that the user equipment may estimate a downlink channel. The user equipment may receive the CSI-RS and may perform downlink channel estimation, and may search for a precoding (hereinafter referred to as "precoding" or "PC") scheme and a post-decoding (hereinafter referred to as "post-decoding" or "PDC") scheme appropriate for the estimated channel.

The channel estimation unit 320 may perform a function of estimating a channel based on the received CSI-RS. A propagation channel H which is the channel estimation result of the channel estimation unit 320 may be a channel matrix. In this example, the channel estimation unit 320 may generate a channel covariance matrix as the propagation channel H corresponding to the channel estimation result. The channel covariance matrix may be generated in the channel estimation unit 320, or may be generated in the channel state information generating unit 330 which will be described later.

Subsequently, the channel state information generating unit 330 may generate channel state information based on the channel estimation result of the channel estimation unit 320. In this example, the channel state information may include information associated with a channel quality, for example, channel quality indicator (CQI) value.

The component elements of the channel state information feedback device according to an embodiment of the present invention in a MIMO system has been described, and hereinafter, one of the component elements of the channel state information feedback device according to an embodiment of the present invention in the MIMO system, that is, the channel state information generating unit, will be described.

Figure 5:
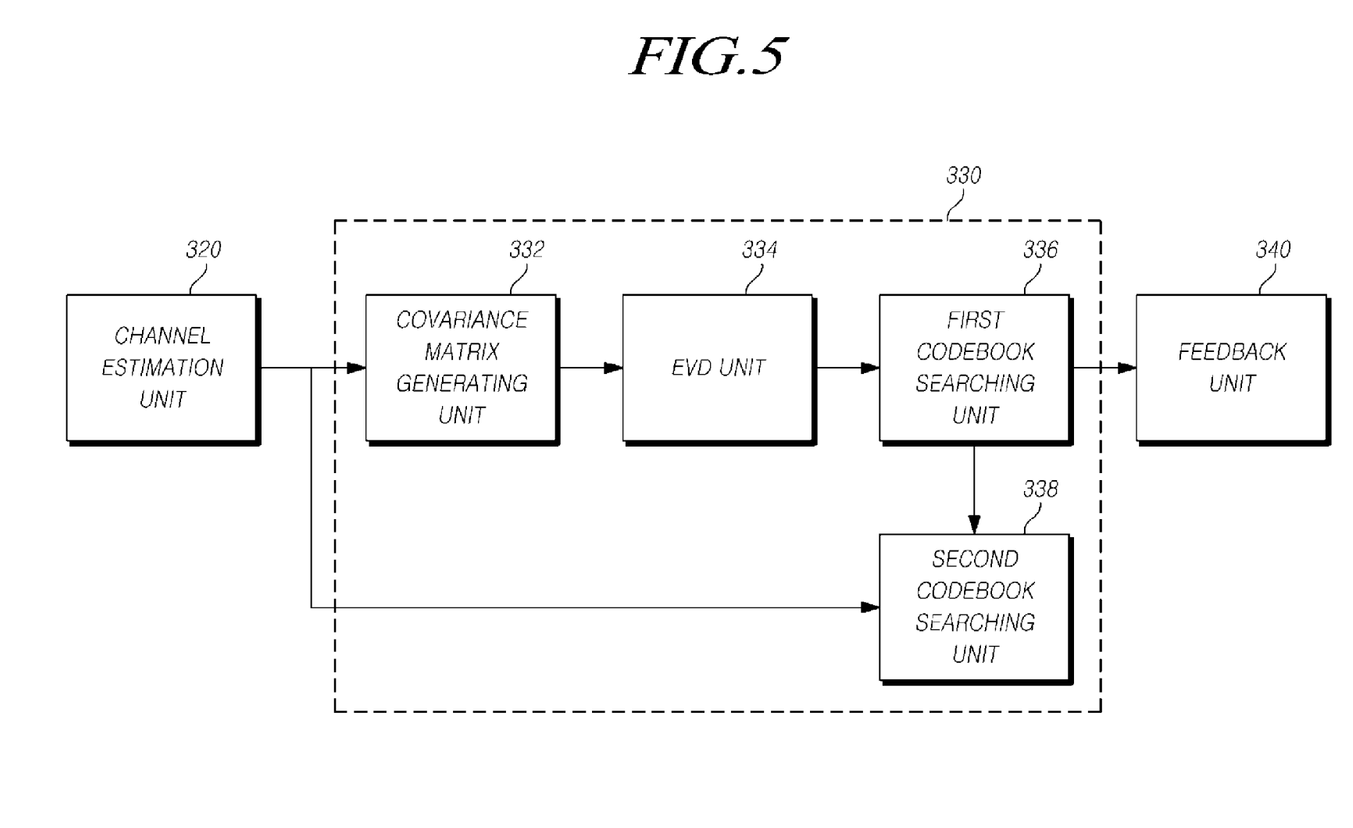
FIG. 5 is a block diagram illustrating a channel state information generating unit of FIG. 4.

FIG. 5 is the block diagram illustrating a channel state information generating unit of FIG. 4.

The channel state information generating unit 330 may include a covariance matrix generating unit 332, an EVD unit 334, a first codebook searching unit 336, and a second codebook searching unit 338.

The covariance matrix generating unit 332 may generate a channel covariance matrix using estimated channel information.

The EVD unit 234 may calculate an eigen vector of the generated covariance matrix. For example, the EVD unit 334 may calculate an eigen vector of a channel matrix using the Hermitian matrix formed by a product of channel matrices having the conjugate transpose as illustrated in Equation 15, but this may not be limited thereto.

$$H^*H = E\ddot{E}E^* \qquad \text{[Equation 15]}$$

Here, H denotes a channel matrix, E denotes an eigen vector, the symbol * denotes a conjugate transpose, and Ë denotes a diagonal matrix of an eigen vector.

The first codebook generating unit 336 may use the eigen vector of the channel covariance matrix so as to select an appropriate internal codeword from a first codebook for internal codewords. The appropriate codeword may be selected from the internal codeword codebook including codewords satisfying $c_{in}^n (c_{in}^n)^H = I$ (a codeword written by an index n).

The second codebook generating unit 338 may use the channel information of the channel estimation unit 320 and the codeword selected by the first codebook generating unit 336, so as to select an appropriate external codeword from a second codebook for external codewords. The appropriate external codeword may be selected from the external codeword codebook including codewords satisfying $V_t \approx c_{in}^n \times c_{out}^m$ ($V_t$ denotes an eiven vector of a channel or a channel covariance matrix at t and $c_{out}^m$ denotes a codeword written by an index m).

Although the covariance matrix generating unit 332, the EVD unit 334, the first codebook searching unit 336, and the second codebook searching unit 338 in the channel state information generating unit 330 are conceptually separated, and they may be embodied separately or integrally and may be embodied integrally as occasion demands.

Referring to FIGS. 3 through 5, the feedback unit 340 may feed back, to the internal precoder 220 and the external precoder 210 of FIG. 3, first feedback information designating the codeword selected by the first codebook generating unit 336, for example, a first precoding matrix indicator ($PMI_{in}$), and second feedback information designating the codeword selected by the second codebook generating unit 338, for example, a second precoding matrix indicator ($PMI_{out}$). In this example, the feedback unit 340 may simultaneously or sequentially transmit the first precoding matrix indicator or the second precoding matrix indicator. The feedback unit 340 may transmit the first precoding matrix indicator or the second precoding matrix indicator at the same transmission period or at different transmission periods.

Hereinafter, a process in which the channel state information generating unit 330 selects appropriate codewords from the first codebook for internal codewords and the first codebook for external codewords, and the feedback unit 340 feeds back the first precoding matrix indicator or the second precoding matrix indicator, will be described in detail.

First, based on a purpose of using the internal precoder 220 and the external precoder 210, $c_{in}^n \times c_{out}^m$ having the most similar form to an eigen vector of a channel may be selected, and PMIs of them may be fed back. As described in the foregoing, $c_{in}^n$ and $c_{out}^m$ may be codewords written by an index n and index m, respectively, from among to codewords included in the internal codeword codebook and the external codeword codebook.

$$(PMI_{in}, PMI_{out}) = \min_{n,m} |V - c_{in}^n \times c_{out}^m| \qquad \text{[Equation 16]}$$

When an inverse matrix of $P_{in}$ exists, $P_{in}$ may become a unitary matrix based on Equation 13 and thus, the following equation become valid.

$$(c_{in}^n)^H (V - c_{in}^n c_{out}^m) = (c_{in}^n)^H V - c_{out}^m \qquad \text{[Equation 17]}$$

Therefore, a codeword included in an internal codeword codebook and a codeword included in an external codeword codebook, satisfying the following equation may be selected, and PMIs of them may be fed back.

$$(PMI_{in}, PMI_{out}) = \min_{n,m} |(c_{in}^n)^H V - c_{out}^m| \qquad \text{[Equation 18]}$$

As another method, $P_{in}$ and $P_{out}$ may be sequentially selected. When a precoding matrix included in the external codeword codebook has a predetermined form as illustrated below, $P_{in}$ and $P_{out}$ may be sequentially selected.

$$c_{out}^n = \begin{bmatrix} \exp(jn_0\theta) & \exp(jn_1\theta) \\ \exp(jn_2\theta) & \exp(jn_3\theta) \end{bmatrix} \qquad \text{[Equation 19]}$$

Here, $n_x$ is a natural number.
In this example, $P_{in}$ may be selected so that $V_{out}$ has the following form.

$$V_{out} = (c_{in}^n)^H V \approx \begin{bmatrix} \exp(jn_0\theta) & \exp(jn_1\theta) \\ \exp(jn_2\theta) & \exp(jn_3\theta) \end{bmatrix} \qquad \text{[Equation 20]}$$

Subsequently, $P_{out}$ may be selected so that the following relationship may be satisfied.

$$(P_{in})^H V \approx \begin{bmatrix} \exp(jn_0\theta) & \exp(jn_1\theta) \\ \exp(jn_2\theta) & \exp(jn_3\theta) \end{bmatrix} \approx c_{out}^n \qquad \text{[Equation 21]}$$

A relation that selects $P_{in}$ and $P_{out}$ may be mathematically expressed.

$$PMI_{in} = \min_n |(c_{in}^n)^H V - C_{out}| \qquad \text{[Equation 22]}$$

$$PMI_{out} = \min_m |(P_{in})^H V - c_{out}^m| \qquad \text{[Equation 23]}$$

Hereinafter, when the codebooks used by the external precoder 210 and the internal precoder 220 have the following forms, precoding performed using a product of the two precoding matrices ($P_{out}$ and $P_{in}$) which is a vector similar to an eigen vector of a channel H with respect to at least the channel H will be described.

$$c_{out}^n = \begin{bmatrix} \exp(jn_0\theta) & \exp(jn_1\theta) \\ \exp(jn_2\theta) & \exp(jn_3\theta) \end{bmatrix} \quad \text{[Equation 24]}$$

$$c_{in}^m = \begin{bmatrix} \exp(jm_0\theta) & \exp(jm_1\theta) \\ \exp(jm_2\theta) & \exp(jm_3\theta) \end{bmatrix} \quad \text{[Equation 25]}$$

Here, $$\theta = \frac{\pi}{4}.$$

As described in the foregoing, the following equation needs to be valid so that $P_{in}P_{in}^H = I$ is satisfied.

$$\exp(jn_0\theta - jn_2\theta) + \exp(jn_1\theta - jn_3\theta) = 0 \quad \text{[Equation 26]}$$

$$(n_0\theta - n_2\theta) = (n_1\theta - n_3\theta) \pm \pi \quad \text{[Equation 27]}$$

A codeword appropriate for the channel H may be selected from among codewords $c_{in}^n$ included in an internal codeword codebook satisfying the above condition.

$$H = \begin{bmatrix} 0.3 + 0.5i & 0.6 + 0.7i \\ 0.7 & 0.8 + 0.8i \end{bmatrix} \quad \text{[Equation 28]}$$

An eigen vector and an eigen value of a channel covariance matrix may be calculated as follows.

$$V = \begin{bmatrix} 0.86e^{j0.41} & 0.51e^{j0.41} \\ -0.51 & 0.86 \end{bmatrix} \quad \text{[Equation 29]}$$

$$\lambda = \begin{bmatrix} 0.12767 & 0 \\ 0 & 2.8333 \end{bmatrix} \quad \text{[Equation 30]}$$

A precoding matrix $P_{in}$ of the internal precoder 220 may be selected so that $V_{out}$ has the following relationship.

$$V_{out} = (c_{in}^n)^H V \approx \begin{bmatrix} \exp(jn_0\theta) & \exp(jn_1\theta) \\ \exp(jn_2\theta) & \exp(jn_3\theta) \end{bmatrix} \quad \text{[Equation 31]}$$

That is, the precoding matrix $P_{in}$ of the internal precoder 220 may be selected as follows.

$$P_{in} = \begin{bmatrix} e^{j5pi/4} & e^{j7pi/4} \\ 1 & e^{j6pi/4} \end{bmatrix}^H \quad \text{[Equation 32]}$$

Therefore, $V_{out}$ may be as follows.

$$V_{out} = P^H V = \begin{bmatrix} e^{j5pi/4} & e^{j7pi/4} \\ 1 & e^{j6pi/4} \end{bmatrix} \times \begin{bmatrix} 0.86e^{j0.41} & 0.51e^{j0.41} \\ 0.51e^{j3.14} & 0.86e^{j0} \end{bmatrix}$$

$$= \begin{bmatrix} 0.81e^{-j3.27pi/4} & 1.16e^{-j1.53pi/4} \\ 1.16e^{j1.05pi/4} & 0.81e^{-j1.21pi/4} \end{bmatrix} \quad \text{[Equation 33]}$$

When $C_{out}^m$ that is most appropriate for $V_{out}$ is selected, a precoding matrix $P_{out}$ of the external precoder 210 may be as follows.

$$P_{out} = \begin{bmatrix} e^{-j3pi/4} & e^{-j2pi/4} \\ e^{jpi/4} & e^{-jpi/4} \end{bmatrix} \quad \text{[Equation 34]}$$

A large similarity may exist between $V_{out}$ and $P_{out}$ and thus, precoding similar to the SVD scheme may be performed.

Hereinafter, when the codebooks used by the external precoder 210 and the internal precoder 220 have the following form, precoding performed using a product of the two precoding matrices ($P_{out}$ and $P_{in}$) which is a vector similar to an eigen vector of a channel H with respect to at least the channel H will be described.

As described in the foregoing, all elements of the precoding matrix $P_{in}$ of the internal precoder 220 may have different amplitudes. However, to maintain transmission power to be identical for each antenna, codewords in a codebook designed for the precoding matrix $P_{in}$ of the internal precoder 220 may be designed to have the identical power for each row and for each column.

When the codebook of the precoding matrix $P_{in}$ of the internal precoder 220 is as follows, the precoding matrix $P_{in}$ of the internal precoder 220 and the precoding matrix $P_{out}$ of the external precoder 210 may be selected in the same manner as the previously described method.

$$c_{in}^m = \frac{1}{\sqrt{5}} \begin{bmatrix} 2\exp(jm_0\theta) & \exp(jm_1\theta) \\ \exp(jm_2\theta) & 2\exp(jm_3\theta) \end{bmatrix} \quad \text{[Equation 35]}$$

The precoding matrix $P_{in}$ of the internal precoder 220 and the precoding matrix $P_{out}$ of the external precoder 210 may be selected in the same manner as the previously described method.

$$P_{in} = \begin{bmatrix} 2\exp(j7\pi/4) & \exp(j\pi/4) \\ \exp(j5\pi/4) & 2\exp(j3\pi/4) \end{bmatrix} \quad \text{[Equation 36]}$$

$$V_{out} = \begin{bmatrix} 1.004\exp(j1.14\pi/4) & 0.996\exp(j2.19\pi/4) \\ 0.996\exp(j0.332\pi/4) & 1.004\exp(-j2.62\pi/4) \end{bmatrix} \quad \text{[Equation 37]}$$

$$P_{out} = \begin{bmatrix} \exp(j\pi/4) & \exp(j2\pi/4) \\ 1 & \exp(-j3\pi/4) \end{bmatrix} \quad \text{[Equation 38]}$$

Even when the codebook of the precoding matrix $P_{in}$ of the internal precoder 220 is formed of elements having different amplitudes, excellent performance may be provided.

Therefore, as described in the foregoing two examples, when the elements included in the codebook of the precoding matrix $P_{in}$ of the internal precoder 220 have different amplitudes, more excellent performance may be provided.

The channel state information feedback device according to an embodiment of the present invention in a MIMO system has been described, and hereinafter, a channel state information feedback method according to an embodiment of the present invention in the MIMO system will be described.

Figure 6:
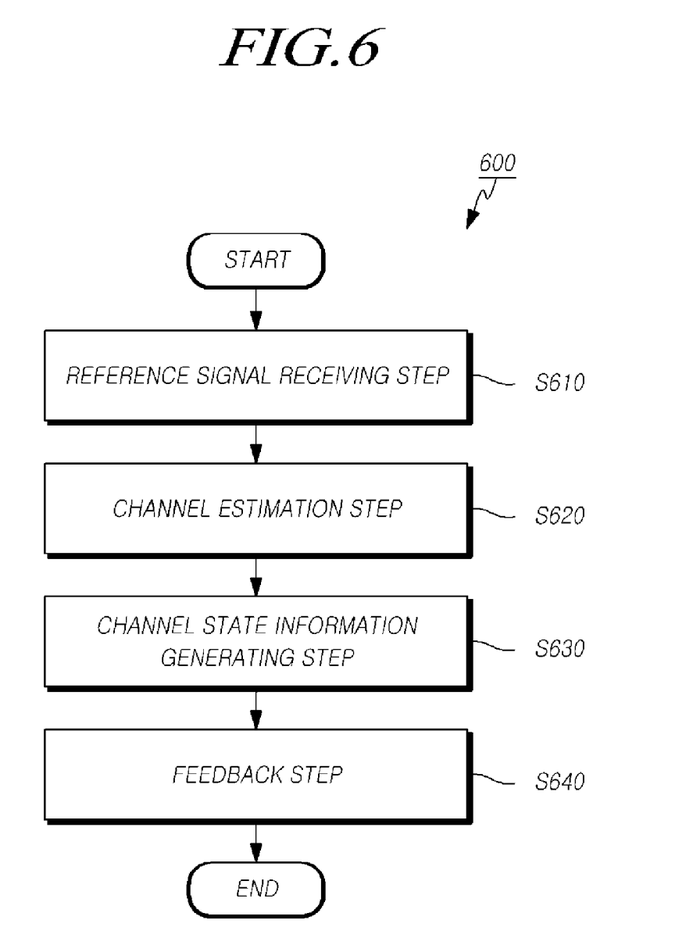
FIG. 6 is a flowchart illustrating a channel state information feedback method according to another embodiment of the present invention.

FIG. 6 is a flowchart illustrating a channel state information feedback method of a user equipment according to another embodiment of the present invention.

A channel state information feedback method 600 according to another embodiment of the present invention may include a reference signal receiving step (step S610) in which a user equipment receives a reference signal from a base station, for example, a channel state index reference signal (CSI-RS), a channel estimation step (step S620) that estimates a channel based on the received CSI-RS, a channel state information generating step (step S630) that generates corresponding channel state information based on a channel estimation result of the channel estimation step (step S620), and a feedback step (step S640) that feeds back the channel state information.

The reference signal receiving step (step S610) and the channel estimation step (step S620) may be embodied separately or integrally, and may be embodied integrally as occasion demands.

In the reference signal receiving step (step S610), the user equipment may receive a CSI-RS unique to a cell, and may have information associated with at which band (subcarrier) of a reception signal and at which symbol the CSI-RS is received and thus, may measure a CSI-RS reception value by determining a signal of a corresponding time-frequency domain.

In the channel estimation step (step S620), the user equipment may perform a function of estimating a channel based on the received CSI-RS.

Subsequently, the channel state information generating step (step S640) may generate channel state information based on the channel estimation result of the channel estimation step (step S620). The channel state information may include a CQI value.

The channel state information feedback method according to an embodiment of the present invention in a MIMO system has been described, and hereinafter, examples of the channel state information generating step, which is one of the steps corresponding to the channel state information feedback method according to an embodiment of the present invention in the MIMO system will be described.

Figure 7:
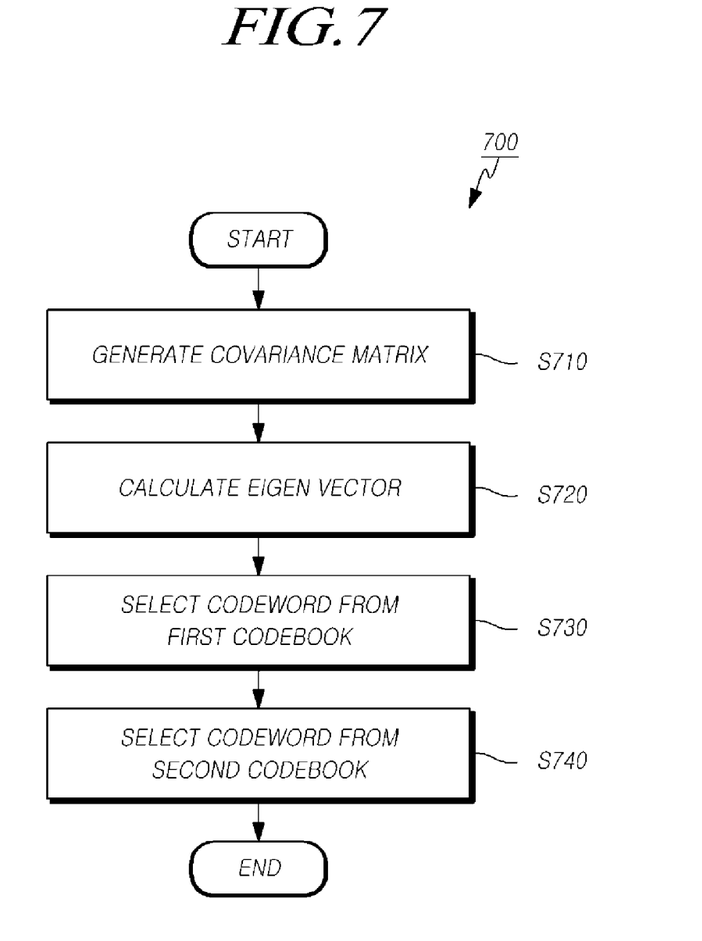
FIG. 7 is a flowchart illustrating an example of a channel state information generating method according to another embodiment of the present invention.

FIG. 7 is a flowchart illustrating an example of a channel state information generating method according to another embodiment of the present invention. A channel state information generating method 700 of FIG. 7 may correspond to a part of the channel state information generating step (step S640), and simultaneously, may configure an independent method. That is, the channel state information generating method 700 of FIG. 7 may configure a method independent from previous and following steps of the channel state information generating step (step S640) of FIG. 6 and the channel state information generating method 700 may be included to embody another technique.

Referring to FIGS. 6 and 7, a user equipment may receive a channel matrix corresponding to a channel estimation result of the channel estimation step (step S620) so as to generate a covariance matrix (step S710).

Subsequently, the user equipment calculates an eigen vector of the covariance matrix or unique vector (characteristic vector) of the covariance matrix (step S720). For example, an eigen vector of a channel matrix may be calculated using the Hermitian matrix formed by a product of channel matrices having the conjugate transpose as described in the foregoing.

Subsequently, the user equipment selects an appropriate codeword from a first codebook for internal codewords, through use of the eigen vector of the channel covariance matrix (step S730).

The user equipment may select an appropriate codeword from a second codebook for external codewords, through use of the channel information of the channel estimation step (step S620) and the codeword selected in step S730 (step S740).

As described in the foregoing, the user equipment may select the codeword included in the first codebook for internal codewords and the codeword included in the second codebook for external codewords, satisfying the following equation, and may feed back PMIs of them.

$$(PMI_{in}, PMI_{out}) = \min_{n,m}|(c_{in}^n)^H V - c_{out}^m| \qquad \text{[Equation 39]}$$

As another method, when a precoding matrix included in the external codeword codebook has a predetermined form as follows, a relation that selects $P_{in}$ and $P_{out}$ may be mathematically expressed.

$$c_{out}^n = \begin{bmatrix} \exp(jn_0\theta) & \exp(jn_1\theta) \\ \exp(jn_2\theta) & \exp(jn_3\theta) \end{bmatrix} \qquad \text{[Equation 40]}$$

$$PMI_{in} = \min_n |(c_{in}^n)^H V - C_{out}| \qquad \text{[Equation 41]}$$

$$PMI_{out} = \min_m |(P_{in})^H V - c_{out}^m| \qquad \text{[Equation 42]}$$

In the channel state information generating step (step S630), step S710, step S720, step S730, and step S740 are conceptually separated, but step S710, step S720, step S730, and step S740 may be embodied separately or integrally, and may be embodied integrally as occasion demands.

Referring to FIGS. 6 and 7, the feedback step (step S640) may feed back first feedback information designating the codeword selected in step S730, for example, a first precoding matrix indicator ($PMI_{in}$), and second feedback information designating the codeword selected in step S740, for example, a second precoding matrix indicator ($PMI_{out}$). In this example, the feedback step (step S640) may simultaneously or sequentially transmit the first precoding matrix indicator or the second precoding matrix indicator. The feedback step (step S640) may transmit the first precoding matrix indicator or the second precoding matrix indicator at the same transmission period or different transmission periods.

The channel state information feedback method according to an embodiment of the present invention in a MIMO system and examples of the channel state information generating step which is one of the steps corresponding to the channel state information feedback method have been described, and hereinafter, a computer-readable recoding medium in which an internal codeword codebook is recorded will be described.

According to another embodiment of the present invention, a computer-readable recording medium that records a codebook including codewords satisfying $c_{in}^n(c_{in}^n)^H = I$ ($c_{in}^n$ denotes a codeword written by an index n) used for precoding of a precoder and indices respectively designating the codewords, may be provided.

The codebook may include codewords associated with respective layers with respect to a plurality of indices. In this example, the codebook may be configured based on a house hold scheme that determines a precoding matrix of a maximum layer, and selects a portion of the precoding matrix of the maximum layer for a precoding matrix of which a number of layers is small.

TABLE 1

| Codebook index | Number of layers v | | | |
|---|---|---|---|---|
| | 1 | 2 | 3 | 4 |
| 0 | $c_0^{\{1\}}$ | $c_0^{\{14\}}/\sqrt{2}$ | $c_0^{\{124\}}/\sqrt{3}$ | $c_0^{\{1234\}}/2$ |
| 1 | $c_1^{\{1\}}$ | $c_1^{\{12\}}/\sqrt{2}$ | $c_1^{\{123\}}/\sqrt{3}$ | $c_1^{\{1234\}}/2$ |
| 2 | $c_2^{\{1\}}$ | $c_2^{\{12\}}/\sqrt{2}$ | $c_2^{\{123\}}/\sqrt{3}$ | $c_2^{\{3214\}}/2$ |
| 3 | $c_3^{\{1\}}$ | $c_3^{\{12\}}/\sqrt{2}$ | $c_3^{\{123\}}/\sqrt{3}$ | $c_3^{\{3214\}}/2$ |

In this example, the codewords may have an inverse-matrix. $c_{in}^{\ n}(c_{in}^{\ n})^H=I$ is valid and the inverse-matrix exists and thus, the codewords may correspond to unitary matrix and the codebook may correspond to a unitary codebook.

The codebook of Table 1 may correspond to the above-described internal codeword codebook. However, the above-described external codeword codebook may be a conventionally used codebook, for example, a codebook used in 3GPP LTE.

The computer-readable recoding medium that records the codebook may be stored in the base station or the user equipment of FIG. 1, and may be used for precoding or feeding back precoding matrix information, but this may not be limited thereto.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A base station in a wireless communication system, the base station comprising:
   a layer mapper to perform mapping of a codeword to a layer;
   at least two precoders to perform precoding of mapped symbols sequentially, using a precoding matrix; and
   two or more antennas to transmit a wireless signal comprising the precoded symbol,
   wherein the most internal precoder from among the precoders performs precoding using a precoding matrix satisfying $P_{in}P_{in}^{\ H}=I$ ($P_{in}$ denotes the most internal precoding matrix, H denotes an operator of the Hermitian matrix, and I denotes a unit matrix),
   wherein the precoding matrix includes the most internal precoding matrix and an external precoding matrix, and the most internal precoding matrix is selected from an internal codeword codebook including codewords satisfying $c_{in}^{\ n}(c_{in}^{\ n})^H=I$ ($c_{in}^{\ n}$ denotes a codeword written by an index n) and the external precoding matrix is selected from an external codeword codebook including codewords satisfying $$\min_{n,m}|V_t - c_{in}^n \times c_{out}^m|$$

($V_t$ denotes an eigen vector of a channel or a covariance matrix at t and $c_{out}^{\ m}$ denotes a codeword written by an index m).

2. The base station of claim 1, wherein the two precoding matrices are selected respectively from the internal codeword codebook and the external codeword codebook through use corresponding channel feedback information of a user equipment.

3. The base station of claim 2, wherein the channel feedback information corresponds to a precoding matrix indicator.

4. The base station of claim 1, wherein the internal codeword codebook and the external codeword codebook are identical to or different from each other.

5. The base station of claim 1, wherein the internal codeword codebook and the external codeword codebook are an independent unitary codebook or not.

6. A channel state information feedback device in a wireless communication system, the device comprising:
   a reference signal receiving unit to receive a reference signal from a base station;
   a channel estimation unit to estimate a channel using the received reference signal;
   a channel state information generating unit to generate, based on a channel estimation result of the channel estimation unit, channel state information including internal channel feedback information designating an internal codeword that is selected from an internal codeword codebook including codewords satisfying $c_{in}^{\ n}(c_{in}^{\ n})^H = I$ ($c_{in}^{\ n}$ denotes a codeword written by an index n) and external channel feedback information designating an external codeword that is selected from an external codeword codebook including codewords satisfying $$\min_{n,m}|V_t - c_{in}^n \times c_{out}^m|$$

($V_t$ denotes an eigen vector of a channel or a channel covariance matrix at t and $c_{out}^{\ m}$ denotes a codeword written by an index m); and a feedback unit to feed back the generated channel state information.

7. The device of claim 6, wherein the internal channel feedback information and the external channel feedback information correspond to an internal precoding matrix indicator ($PMI_{in}$) and an external precoding matrix indicator ($PMI_{out}$), respectively.

8. The device of claim 7, wherein the internal precoding matrix indicator ($PMI_{in}$) and the external precoding matrix ($PMI_{out}$) satisfy the following equation:

$$(PMI_{in}, PMI_{out}) = \min_{n,m}|(c_{in}^n)^H V - c_{out}^m|,$$

wherein V denotes an eigen vector of a channel H.

9. A channel state information feedback method, the method comprising:

a reference signal receiving step that receives a reference signal from a base station;

a channel estimation step that estimates a channel using the received reference signal;

a channel state information generating step that generates, based on a channel estimation result of the channel estimation step, channel state information including internal channel feedback information designating an internal codeword that is selected from an internal codeword codebook including codewords satisfying $c_{in}^{\ n}(c_{in}^{\ n})^H = I$ ($c_{in}^{\ n}$ denotes a codeword written by an index n) and external channel feedback information designating an external codeword that is selected from an external codeword codebook including codewords satisfying $$\min_{n,m}|V_t - c_{in}^n \times c_{out}^m|$$

($V_t$ denotes an eigen vector of a channel or a channel covariance matrix at t and $c_{out}^{\ m}$ denotes a codeword written by an index m); and a feedback step that feeds back the generated channel state information.

10. The method of claim 9, wherein the internal channel feedback information and the external channel feedback information correspond to an internal precoding matrix indicator ($PMI_{in}$) and an external precoding matrix indicator ($PMI_{out}$), respectively.

11. The method of claim 10, wherein the internal precoding matrix indicator ($PMI_{in}$) and the external precoding matrix ($PMI_{out}$) satisfy the following equation:

$$(PMI_{in}, PMI_{out}) = \min_{n,m}|(c_{in}^n)^H V - c_{out}^m|,$$

wherein V denotes an eigen vector of a channel H.

* * * * *